3,561,987
CHROME BASE PLASTIC REFRACTORY
Louis J. Jacobs, Chicago, Robert E. Fisher, Clarendon Hills, and Carl J. Cherry, Chicago, Ill., assignors to Combustion Engineering, Inc., Windsor, Conn., a corporation of Delaware
No Drawing. Filed June 13, 1968, Ser. No. 736,592
Int. Cl. C04b 35/42
U.S. Cl. 106—66                    10 Claims

ABSTRACT OF THE DISCLOSURE

A chrome base plastic refractory material employing an acid phosphate binder, such as aluminum phosphate or phosphoric acid, and a coating on the chrome ore particles to prevent reaction between the basic constituents of the ore and the acid binder during storage. The coating solution contains sodium zinc hexametaphosphate, cupric acetate and sodium nitrite.

BACKGROUND OF THE INVENTION

Chrome refractories, mainly in the form of bricks, have been used in the steel industry for many years chiefly as a "neutral" zone between acid and basic refractories. This is due to the fact that chrome ore is the least basic of all of the basic refractories. Such chrome refractories have also been used for facing the port blocks and as subhearths in basic open hearth furnaces. Plastic chrome refractories have been used in numerous locations because of their resistance to attack by slag and molten metal and because of their ease of application. A major use of plastic chrome refractories is for coating studded tube walls in boilers because of the resistance of the refractory to the fluid slags encountered in certain types of boiler installations. A related application is in the paper industry where black liquor from the digesters is burned in chemical recovery furnaces which produces extremely corrosive reaction products. Plastic chrome refractories are used in the critical areas of these furnaces to protect the metal tubes. These plastic refractories are also used extensively around open hearth doors.

The most of the chrome ore plastics and ramming mixes contain a mixture of chrome ore and sodium silicate binders. Upon drying such materials, the sodium silicate migrates to the surface and forms an impervious skin. Special care must be taken to assure that the drying takes place in a high humidity atmosphere to prevent steam from forming during the drying and heat-up cycle which would cause the working face of the refractory to blow off. Also, since the sodium silicate migrates to the surface, the refractory away from the surface is considerably lower in strength because of the lower binder content. The presence of the sodium silicate also lowers the refractoriness of the chrome ore.

In order to counteract the above-noted disadvantages of sodium silicate binders in chrome ore plastic refractories, mixes have been developed employing acid phosphate binders such as phosphoric acid and aluminum phosphate. However, such formulations present a problem in that the acidic binder will react with the basic constituents of the chrome ore, namely the calcium, magnesium and iron oxide, during storage and prior to use thus destroying the effectiveness of the refractory mixture. It has therefore been customary to add the acidic binders to the ore in the field just prior to installing the refractory. If the binders is added prior to this time, the shelf life is very limited.

SUMMARY OF THE INVENTION

An object of the present invention is to provide a chrome base plastic refractory formulation employing acidic binders incorporating materials to prevent reaction between the binder and the chrome ore constituents. Such a refractory mixture would have a long shelf life and thus could be premixed.

A related object of the invention is to provide a chrome ore refractory formulation which is as workable as a plastic fire clay refractory and can be easily installed, thus reducing the necessity and expense of a large inventory of specially shaped bricks.

Other object and advantages of the invention will be more apparent from the following detailed description.

DESCRIPTION OF THE PREFERRED EMBODIMENTS

It has been discovered that the chrome ore particles can be coated with a protective film prior to mixing the ore with an acidic binder such that the binder cannot come into intimate contact with the basic constituents of the ore and thus cannot react therewith. The coating material of the present invention is prepared by dissolving granular sodium zinc hexametaphosphate in water together with cupric acetate and sodium nitrite. The sodium zinc hexametaphosphate is a colorless glass material which is commercially available in water soluble form. The material is similar in composition to sodium hexametaphosphate $(NaPO_3)_6$, but with some of the sodium replaced with zinc. One commercial source of the material is from Hagan Chemicals & Controls Inc. under the trade name "Calgon Composition TG." The specific manner of treating the ore with this solution will be described more fully hereinafter.

The following is a suggested range of compositions for the refractory mixture of the present invention on a weight basis:

|  | Parts by weight |
|---|---|
| Chrome ore | 70.0–95.0 |
| Sodium zinc hexametaphosphate | 0.01– 1.5 |
| Cupric acetate | 0.01– 1.0 |
| Sodium nitrite | 0.01– 5.0 |
| Aluminum phosphate | 0.05–10.0 |
| Western bentonite | 0.5–12.0 |
| Water | 4.0–10.0 |

The following is a preferred specific composition:

|  | Percent |
|---|---|
| Chrome ore | 86.275 |
| Sodium zinc hexametaphosphate, crushed | 0.316 |
| Cupric acetate, normal | 0.105 |
| Sodium nitrite | 0.021 |
| Aluminum phosphate | 2.104 |
| Western bentonite | 2.841 |
| Water | 8.338 |

By way of example, typical specifications of commercial chrome ores suitable for use in the present invention are as follows:

|  | Specific, percent | Range, percent |
|---|---|---|
| Chromic oxide | 45.22 | 44.0–46.0 |
| Silica | 2.10 | 0.5–2.5 |
| Ferrous oxide | 22.90 | 20.0–24.0 |
| Calcium oxide | 0.51 | 0.2–0.7 |
| Alumina | 15.85 | 12.0–18.0 |
| Magnesium oxide | 10.33 | 8.0–12.0 |

The chrome ore is most advantageously sized to get the maximum density of the product at a minimum cost. A typical particle size distribution which can be employed is as follows:

Mesh: Percent retained
- 3 — 5.9
- 4 — 8.9
- 6 — 5.6
- 8 — 4.5
- 10 — 1.8
- 20 — 9.8
- 30 — 7.1
- 40 — 7.5
- 50 — 7.9
- 70 — 9.0
- 100 — 3.4
- 140 — 5.1
- 200 — 6.2
- 270 — 5.6
- Through 270 — 10.7

The western bentonite listed in the above formulation is a clay containing appreciable amounts of the mineral montmorillonite which swells greatly by the absorption of water. This material gives the resulting refractory mixture its plasticity. The following is a typical chemical analysis and particle size analysis of western bentonite:

Percent
- Silica — 64.0
- Alumina — 21.0
- Ferric oxide — 3.03
- Ferrous oxide — 0.46
- Magnesium oxide — 2.30
- Calcium oxide — 0.50
- Sodium oxide — 2.60
- Potassium oxide — 0.40
- Loss on ignition — 5.20

Particle size range:

| U.S. standard sieve | Percent retained | |
|---|---|---|
| | Minimum | Maximum |
| 100 | 0.0 | 0.1 |
| 200 | 1.0 | 2.4 |
| 270 | 1.0 | 2.4 |
| 325 | 54.0 | 60.0 |
| Through 325 | 35.0 | 41.5 |

As an alternative to the use of bentonite, other clays such as kaolin could be used or other plastic materials could be substituted such as methyl cellulose.

The chrome ore which has been properly sized is placed in a muller type mixer and the solution containing the sodium zinc hexametaphosphate and sodium nitrite and cupric acetate is added to the chrome ore in the mixer. A higher percentage of solution should be added if the ore is ground on the fine side since there is more surface area to coat. After mixing for a period of about 2 minutes, the aluminum phosphate or phosphoric acid binder is added followed by the addition of the bentonite. The mixture is then mulled for an additional period of time such as 5 minutes. Any additional water which may be required to give the desired consistency is also added to the mixer. The mixing times are not critical but too much mulling might abraid the ore particle surface and remove the coating.

The resulting refractory mix is next discharged from the mixer and formed into blocks and packaged for shipment to the job site. This may be accomplished by discharging the material from the mixer into an extruder which will compact the material into blocks which are then cut to the desired length, packaged in polyethylene plastic bags and sealed. In such a state the mixture cannot dry out and there can be no harmful reaction between the binder and the ore constituents. The mixture therefore does not stiffen or harden during storage. At the job site, the refractory mixture is removed from the container and rammed into place in the furnace. No special precautions are necessary in drying the refractory or on firing up the furnace to operating temperature.

Although the specific mechanism by which the coating solution operates to form the protective film and prevent the binder from attacking the ore is not known, it is suspected that there is some sort of plating action and that the particles are covered with zinc and copper compounds. The following are some of the properties of the chrome base plastic refractory both in the green state as received from the manufacturing plant, and after being heat treated to various temperatures as indicated:

Green moisture (A.S.T.M. Test Method C–92)—6.2%
Green workability (A.S.T.M. Test Method C–181)—30.0
Green compression—25 p.s.i.
Linear change, ° F.:
- 230——0.6%
- 2550——0.9%
- 2910——2.0%

Modulus of rupture, ° F.:
- 230—500 p.s.i.
- 1500—510 p.s.i.
- 2550—600 p.s.i.
- 2910—510 p.s.i.

Slump:
- 2912° F.——2.5%

The chemical analysis of the chrome base plastic refractory in the green state or as-shipped condition is as follows:

Percent
- Chromic oxide — 40.05
- Silica — 3.72
- Alumina — 15.57
- Ferrous oxide — 20.77
- Calcium oxide — 0.44
- Magnesium oxide — 9.92
- Sodium oxide — 0.17
- Potassium oxide — 0.01
- Titanium dioxide — 0.20
- Loss on ignition — 9.15

One of the outstanding features of the refractory mixture with the acid phosphate binders is the low shrinkage. The binder is also more refractory than sodium silicate binders and thus does not contribute to the fluxing or melting of the chrome at relatively low temperatures. Also, the binder does not migrate to the surface as do binders such as sodium silicate. The use of the coating material for the ore particles makes the use of these acid phosphate binders practical since they can be premixed with no reduction in the workability after long periods of storage. These materials might be stored for periods even as long as a year whereas previous shelf-lives have been limited to a few hours.

While preferred embodiments of the invention have been described and specific examples have been given, it will be understood that these are merely illustrative and that changes may be made without departing from the spirit and scope of the invention as claimed.

We claim:
1. A plastic refractory mix consisting essentially of:

|  | Parts by weight |
|---|---|
| Chrome ore | 70.0–95.0 |
| Sodium zinc hexametaphosphate | 0.01–1.5 |
| Cupric acetate | 0.01–1.0 |
| Sodium nitrite | 0.01–5.0 |
| Aluminum phosphate | 0.5–10.0 |
| Western bentonite | 0.5–12.0 |
| Water | 4.0–10.0 | said chrome ore having a first coating thereon formed by applying a solution of said sodium zinc hexametaphosphate and cupric acetate and sodium nitrite and subsequent coatings thereon of said aluminum phosphate and said western bentonite.

2. A plastic refractory mix as claimed in claim 1 wherein said chrome ore consists essentially of:

|  | Weight percent |
|---|---|
| Chromic oxide | 44.0–46.0 |
| Silica | 0.5–2.5 |
| Ferrous oxide | 20.0–24.0 |
| Calcium oxide | 0.2–0.7 |
| Alumina | 12.0–18.0 |
| Magnesium oxide | 8.0–12.0 |

3. A method of preparing a plasitc refractory mix comprising dissolving sodium zinc hexametaphosphate and sodium nitrite and cupric acetate in water to form a solution, mixing a sufficient quantity of said solution with chrome ore particles to form a protective film on said ore particles, and then mixing a binding amount of aluminum phosphate binder and western bentonite with said ore particles.

4. A process for preparing a plastic refractory mix comprising the steps of:
  (a) adding chrome ore to a mixer;
  (b) dissolving sodium zinc hexametaphosphate, sodium nitrite and cupric acetate in water to form a solution;
  (c) adding a sufficient quantity of said solution to said mixer to form a protective film on said chrome ore and mixing said solution and said chrome ore;
  (d) adding a binding amount of an aluminum phosphate binder and western bentonite to said chrome ore in said mixer and mixing to form said plastic refractory mix.

5. A process for preparing a plastic refractory mix comprising the steps of:
  (a) dissolving between about 0.01–1.5 parts by weight sodium zinc hexametaphosphate and 0.01–1.0 part by weight cupric acetate and 0.01–5.0 parts by weight sodium nitrite in up to 4.0–10.0 parts by weight water to form a solution,
  (b) adding said solution and between about 70.0–95.0 parts by weight chrome ore to a muller type mixer,
  (c) mixing said solution and said chrome ore in said mixer,
  (d) adding between about 0.5–10.0 parts by weight aluminum phosphate to said mixer,
  (e) mixing said aluminum phosphate with said solution and said chrome ore in said mixer to form said plastic refractory mix,
  (f) discharging said plastic refractory mix from said mixer and forming said mix into shapes.

6. A process as claimed in claim 5 and further including the step of adding a material to said mix to give plasticity to said mix.

7. A process as claimed in claim 6 wherein said material is selected from the group consisting of western bentonite, kaolin and methyl cellulose.

8. A process as claimed in claim 6 wherein said material is between about 0.5–12.0 parts by weight western bentonite.

9. A plastic refractory mix consisting essentially of chrome ore particles, a binding amount of an acid phosphate binder and a coating on said ore particles sufficient to form a protective film to prevent reaction between said binder and said ore, said coating being formed by applying a solution containing sodium zinc hexametaphosphate and cupric acetate and sodium nitrite to said ore particles.

10. A plastic refractory mix as claimed in claim 9 and further including western bentonite.

References Cited
UNITED STATES PATENTS

| 2,425,151 | 8/1947 | Greger | 106—67 |
| 2,619,426 | 11/1952 | Greger | 106—85 |
| 2,965,505 | 12/1960 | Mikami | 106—66 |
| 3,197,315 | 7/1965 | Jacobs et al. | 106—65 |
| 3,475,188 | 10/1969 | Woodhouse et al. | 106—66 |

JAMES E. POER, Primary Examiner